US012635697B2

(12) United States Patent
Park

(10) Patent No.: US 12,635,697 B2
(45) Date of Patent: May 26, 2026

(54) BREAD CONTAINING BAMBOO LEAF EXTRACT AND METHOD FOR MANUFACTURING SAME

(71) Applicant: You Bum Park, Seoul (KR)

(72) Inventor: You Bum Park, Seoul (KR)

( * ) Notice: Subject to any disclaimer, the term of this patent is extended or adjusted under 35 U.S.C. 154(b) by 278 days.

(21) Appl. No.: 18/471,311

(22) Filed: Sep. 21, 2023

(65) Prior Publication Data

US 2024/0023564 A1      Jan. 25, 2024

Related U.S. Application Data

(63) Continuation-in-part of application No. PCT/KR2022/004774, filed on Apr. 4, 2022.

(30) Foreign Application Priority Data

Apr. 8, 2021    (KR) ........................ 10-2021-0045586

(51) Int. Cl.
| | |
|---|---|
| *A21D 2/36* | (2006.01) |
| *A21D 8/04* | (2006.01) |
| *A21D 10/00* | (2006.01) |

(52) U.S. Cl.
CPC ............... *A21D 2/368* (2013.01); *A21D 8/04* (2013.01); *A21D 10/002* (2013.01)

(58) Field of Classification Search
CPC ........ A21D 2/368; A21D 8/04; A21D 10/002; A21D 8/06; A21D 2/36; A21D 10/00
See application file for complete search history.

(56) References Cited

FOREIGN PATENT DOCUMENTS

| | | | | | | |
|---|---|---|---|---|---|---|
| CN | 105341079 | A | * | 2/2016 | ............. | A21D 13/00 |
| JP | 2000270760 | A | * | 10/2000 | ............. | C04B 28/02 |
| KR | 20050055124 | A | * | 6/2005 | | |
| KR | 101550851 | B1 | * | 9/2015 | ............. | A21D 2/34 |
| KR | 1020190108980 | A | | 9/2019 | | |
| KR | 1020200016153 | A | | 2/2020 | | |
| KR | 102349790 | B1 | | 1/2022 | | |
| RU | 2363161 | C1 | * | 8/2009 | | |

OTHER PUBLICATIONS

KR20050055124-A (Clarivate machine translation) (Year: 2005).*
Zhang et al., "Study on reduction of acrylamide in fried bread sticks by addition of antioxidant of bamboo leaves and extract of green tea", Asia Pac J Clin Nutr 2007;16 (Suppl 1): 131-136 [p. 131 only] (Year: 2007).*
RU2363161 C1 (Clarivate machine translation) (Year: 2009).*
KR101550851 B1 (Clarivate machine translation ) (Year: 2015).*
CN105341079-A (Clarivate machine translation ) (Year: 2016).*
JP2000270760-A (Clarivate machine translation) (Year: 2000).*

* cited by examiner

*Primary Examiner* — Nikki H. Dees
*Assistant Examiner* — Andrew E Merriam

(57)            ABSTRACT
The present invention relates to bread containing bamboo leaf extract and its manufacturing method. By powdering bamboo leaves, which are widely used as herbal medicine for their excellent moisture retention and medicinal properties, and boiling them in water to obtain a final liquid extract, this extract is used as the liquid base for kneading bread ingredients that include wheat flour. This enhances the moisture-retaining effect of the bread. Furthermore, a fermented bamboo leaf liquid starter is made using bamboo leaves, and this starter is mixed and fermented with wheat flour and water to create a fermented bamboo leaf starter. This starter is then incorporated into the dough, thereby promoting the fermentation of the dough alongside yeast, resulting in bread that is both chewy and flavorful.

6 Claims, 5 Drawing Sheets

2

3

4

BREAD CONTAINING BAMBOO LEAF EXTRACT AND METHOD FOR MANUFACTURING SAME

TECHNICAL FIELD

The present invention relates to bread containing bamboo leaf extract and the manufacturing method thereof.

BACKGROUND ART

The conventional manufacturing method of bread involves mixing wheat flour, rice flour, or a blend of wheat flour and rice flour with yeast in water to make dough. This dough is then fermented and baked in an oven to produce bread. During the dough-making process, various required ingredients such as milk, eggs, and butter are added to produce various forms of bread.

Depending on the composition of the ingredients included in the dough, the produced bread is categorized into various forms; bread without milk, eggs, and butter becomes a hard-type bread like a baguette, while those containing these ingredients become a soft-type bread like white bread.

Such conventionally made bread faces the issue of rapid aging due to moisture evaporation if not properly preserved during the sales process or after purchase. As a result, the bread becomes crumbly, significantly diminishing its texture. Therefore, there is an urgent need for solutions to address the moisture loss in the manufactured bread.

In the prior art, patents have been disclosed for manufacturing bread or noodles using bamboo leaves. Traditionally, bamboo leaves were mostly used in a finely ground powder form and mixed with wheat flour, serving merely as a healthful ingredient.

For example, Korean patent publication no. KR10-2020-0016153, titled "Bakery Products Containing Dietary Fiber and the Manufacturing Method Thereof," was disclosed on Feb. 14, 2020. The main ingredient in the food composition used in this document is bamboo shoot, which is different from the bamboo leaf in the present invention. Even if we consider bamboo shoot as a similar ingredient to bamboo leaf, the bamboo shoot was freeze-dried and powdered to be used as dietary fiber. Specifically, the document states, "The whole shoot was boiled for about an hour at a temperature above 100° C. and then soaked in cold water to separate the bamboo shoot and its skin. These were then rapidly frozen at −80° C. for preservation. As a preprocessing step, both the bamboo shoot and its skin were extracted using water and ethanol as extraction solvents. To 100 g of the acquired bamboo shoot sample, distilled water was added and soaked at room temperature for 2 hours, followed by heating for 1 hour at 100° C. The pellet-type insoluble fiber, excluding the soluble fiber in the supernatant, was obtained."

The above-mentioned prior art mixes a small amount of bamboo shoot powder with grain powder to make dough, thus serving merely as a type of dough ingredient. Because this bamboo shoot powder is not in liquid form, it fails to evenly penetrate throughout the dough. As a result, it has limitations in preserving the moisture in the manufactured bread and is ineffective in removing any residual odors.

Additionally, another prior art, Korean patent publication no. KR10-2019-0108980, titled "Manufacturing Method of Black Bamboo Noodles Using Black Bamboo Leaves and Noodles Manufactured Thereby," was disclosed on Sep. 25, 2019. This patent involves a step of drying and grinding black bamboo leaves to create a powder and a step of mixing this black bamboo leaf powder with wheat flour, thus also employing black bamboo leaves in a powdered form.

This prior art uses powdered black bamboo leaves mixed with wheat flour as a dough ingredient. As already explained, since the black bamboo leaf powder is used in a powdered form for making the dough, it fails to evenly penetrate throughout the dough. Therefore, it has limitations in retaining moisture in the manufactured noodles and is ineffective in efficiently removing any residual odors.

Therefore, there is an urgent need for a bread and its manufacturing method that can improve moisture retention and reduce the residual odor of wheat flour. This is achieved by boiling bamboo leaf powder in water to obtain a liquid form, and using this liquid as the base liquid for making the dough. This base liquid evenly penetrates throughout the dough, providing a coating function that envelops the entire composition of the manufactured bread, thereby suppressing moisture evaporation.

DISCLOSURE

Technical Problem

Thus, the present invention aims to address the various problems of conventional bread, and one of its objectives is to provide a bread and its manufacturing method that can improve moisture retention while reducing the residual smell of wheat flour. This is achieved by boiling bamboo leaf powder in water to obtain a liquid extract. This liquid extract serves as the base liquid for making the dough, which includes wheat flour as an ingredient. As a result, the liquid used in the dough is entirely comprised of bamboo leaf extract, allowing it to evenly and seamlessly penetrate and coat the dough. This enhances the moisture-retaining effect in the manufactured bread while reducing the residual odor of wheat flour.

Another objective of this invention is to create a fermented bamboo leaf starter using bamboo leaves. This fermented bamboo leaf starter is mixed with wheat flour and water to form dough, which is then further fermented. The fermented bamboo leaf starter is added to the dough to accelerate its fermentation in conjunction with yeast, thereby producing bread that is both chewy and flavorful.

Technical Solution

The manufacturing method of bread containing bamboo leaf extract for achieving the above-mentioned task comprises the following steps: (S1) mixing wheat flour, bamboo leaf extract, sugar, yeast, and salt to form a dough;

(S2) placing the matured dough from step (S1) in a fermentation chamber at a temperature between 28° C. to 32° C. for 40 minutes to 1 hour to perform a first fermentation;

(S3) dividing the product of the first fermentation, obtained from step (S2), into predetermined sizes and shaping it into a desired form;

(S4) placing the shaped product of the first fermentation from step (S3) into a fermentation chamber at a temperature between 28° C. to 32° C. for 40 minutes to 1 hour to perform a second fermentation; and (S5) placing the product of the second fermentation, obtained from step (S4), into an oven and baking it at a temperature between 150° C. to 220° C. for 10 to 30 minutes.

In the step S1 of the present invention, additional fermented bamboo leaf starter may be mixed in.

In the step S1 of the present invention, one or more selected from milk, eggs, and butter may also be mixed in.

The dough of the step S1 according to the present invention includes 100 parts by weight of wheat flour, and based on this wheat flour, it includes 30 to 90 parts by weight of bamboo leaf extract, 1 to 20 parts by weight of sugar, 0.5 to 3 parts by weight of yeast, and 0.5 to 3 parts by weight of salt; or Alternatively, it includes 100 parts by weight of wheat flour, and based on this wheat flour, it includes 30 to 90 parts by weight of bamboo leaf extract, 5 to 30 parts by weight of fermented bamboo leaf starter, 1 to 20 parts by weight of sugar, 0.5 to 3 parts by weight of yeast, and 0.5 to 3 parts by weight of salt.

The bamboo leaf extract in the step S1 according to the present invention is obtained by placing water and bamboo leaf powder in a container at a weight ratio of 1:0.01 to 0.2, and heating them until they reach 30 to 80% of their initial combined weight, thereby obtaining a liquid; or Alternatively, water, bamboo leaf powder, and aloe powder are placed in a container at a weight ratio of 1:0.01 to 0.2:0.005 to 0.1 and heated until they reach 30 to 80% of their initial combined weight, thereby obtaining a liquid.

The bamboo leaf extract in the step S1 according to the present invention is obtained by heating water containing 100 parts by weight and raw bamboo leaves of 10 to 60 parts by weight, or water containing 100 parts by weight, raw bamboo leaves of 10 to 60 parts by weight and raw aloe of 1 to 20 parts by weight, until they reach 50 to 80% of their initial combined weight, thereby obtaining a highly concentrated liquid. This obtained liquid is diluted with water when used in the dough.

The fermented bamboo leaf starter according to the present invention includes 100 parts by weight of water as a basis, and based on this, 80 to 120 parts by weight of wheat flour, and 5 to 15 parts by weight of fermented bamboo leaf liquid starter are placed into a microbial incubator and fermented at temperatures below 30° C. for 20 to 30 hours.

The present invention may further include a step S1-1; of placing the dough produced in the step S1 into a maturation chamber at 3 to 7° C. and low-temperature maturing it for 12 to 24 hours, after completing the step S1 but before proceeding to step S2.

In the present invention, milk, eggs, and butter are used in an amount of 5 to 30 parts by weight, based on 100 parts by weight of wheat flour.

The fermented bamboo leaf liquid starter according to the present invention includes 100 parts by weight of water as a basis, and based on this, 5 to 20 parts by weight of raw bamboo leaves and 1 to 5 parts by weight of raw aloe are placed into a container and boiled until they reach 30 to 80% of their initial combined weight, thereby obtaining a liquid. The temperature is then reduced to below 30° C., and subsequently, the obtained liquid, rice bran enzyme, and brown rice yeast are mixed at a weight ratio of 1:0.05 to 0.3:0.03 to 0.1 and placed into a microbial incubator and fermented at temperatures below 30° C. for 2 to 4 days.

Advantageous Effects

The present invention has the advantage of using bamboo leaf extract, which is widely known as a medicinal herb with excellent therapeutic properties, as the base liquid for making dough in bread. This approach allows the bamboo leaf extract to uniformly penetrate the dough, thereby coating all ingredients in the finished bread. This suppresses moisture evaporation and enhances the moisture-retaining effect of the bread.

Therefore, the bread manufactured with the moisturizing function of the bamboo leaf extract can suppress moisture evaporation. As a result, the bread can maintain its delicious taste even when it approaches its expiration date.

Additionally, this invention has the advantage of providing delicious bread by significantly reducing the distinct smell of wheat flour while maintaining moisture, as the bamboo leaf extract permeates both the inside and outside of the bread.

Moreover, this invention utilizes rice bran enzyme to culture and ferment bamboo leaves, creating a fermented bamboo leaf liquid starter. This liquid starter is then mixed with wheat flour and water to produce fermented bamboo leaf starter. By incorporating this fermented bamboo leaf starter as a dough ingredient, the fermented bamboo leaf starter, along with yeast, enhances the fermentation of the dough, resulting in bread that is both chewy and flavorful.

DESCRIPTION OF REFERENCE NUMERALS

1: Bamboo leaves

2: Fermented bamboo leaf starter

3: Moisture meter

4: Bread

BEST MODE

Figure 1:
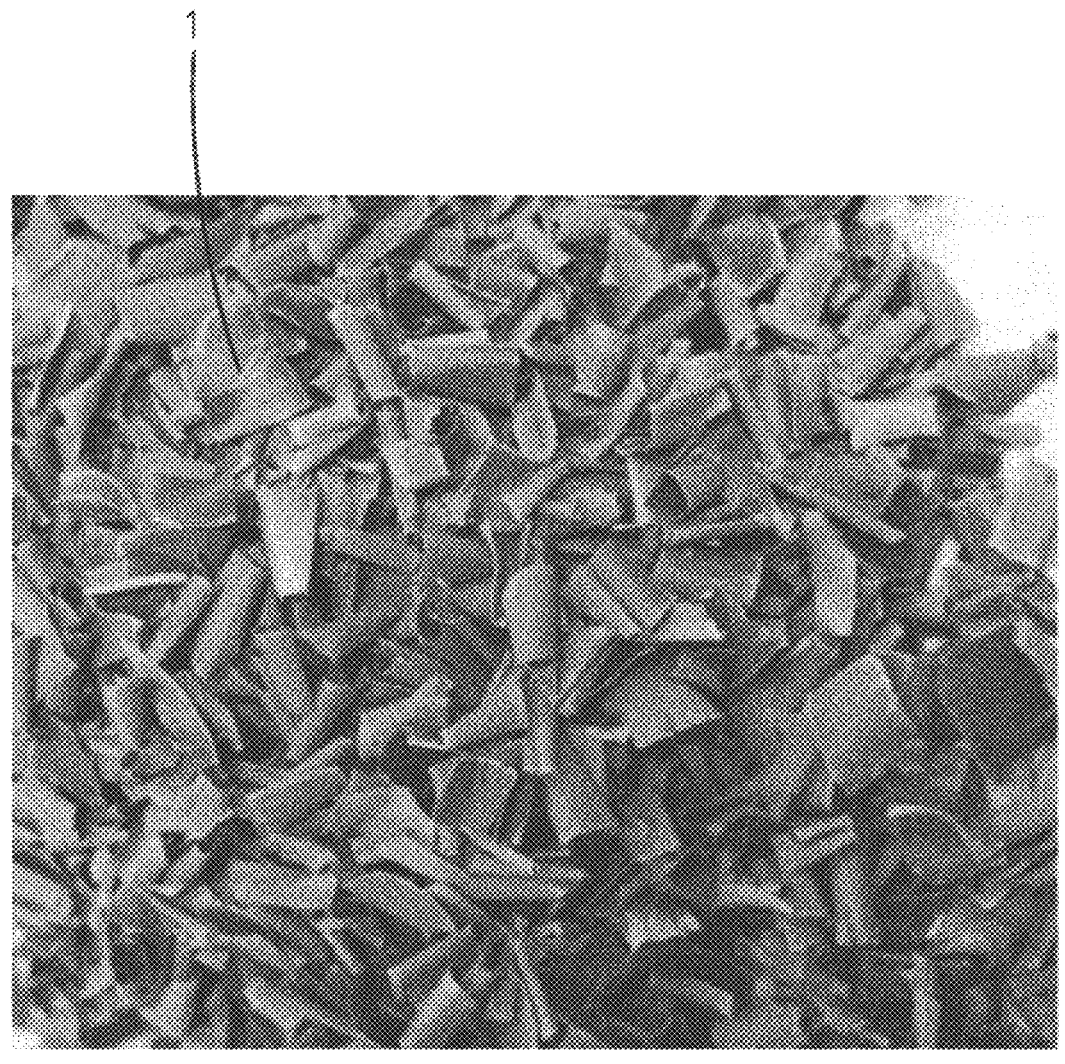
FIG. 1 is a photograph of dried bamboo leaves used in this invention.

A manufacturing method for bread containing bamboo leaf extract according to the present invention includes the following steps:

(S1) mixing wheat flour, bamboo leaf extract, sugar, yeast, and salt to form a dough;

(S2) placing the matured dough from step (S1) in a fermentation chamber at a temperature between 28° C. to 32° C. for 40 minutes to 1 hour to perform a first fermentation;

(S3) dividing the product of the first fermentation, obtained from step (S2), into predetermined sizes and shaping it into a desired form;

(S4) placing the shaped product of the first fermentation from step (S3) into a fermentation chamber at a temperature between 28° C. to 32° C. for 40 minutes to 1 hour to perform a second fermentation; and (S5) placing the product of the second fermentation, obtained from step (S4), into an oven and baking it at a temperature between 150° C. to 220° C. for 10 to 30 minutes.

BEST MODE FOR CARRYING OUT THE INVENTION

Hereinafter, the bread containing bamboo leaf extract and its manufacturing method according to the present invention will be described in detail with reference to the attached drawings.

The manufacturing method for bread containing bamboo leaf extract according to the present invention includes:

(S1) mixing wheat flour, bamboo leaf extract, sugar, yeast, and salt to form a dough;

(S2) placing the matured dough from step (S1) in a fermentation chamber at a temperature between 28 to 32° C. for 40 minutes to 1 hour for the first fermentation;

(S3) dividing the product of the first fermentation, obtained from step (S2), into predetermined sizes and shaping it into a desired form;

(S4) placing the shaped product of the first fermentation from step (S3) into a fermentation chamber at a temperature between 28 to 32° C. for 40 minutes to 1 hour for the second fermentation; and (S5) placing the product of the second fermentation, obtained from step (S4), into an oven and baking it at a temperature between 150 to 220° C. for 10 to 30 minutes.

The aforementioned step S1 is a process of gathering ingredients for bread and forming a dough. The composition and amounts include 100 parts by weight of wheat flour, and based on this wheat flour, it includes 30 to 90 parts by weight of bamboo leaf extract, 1 to 20 parts by weight of sugar, 0.5 to 3 parts by weight of yeast, and 0.5 to 3 parts by weight of salt.

Wheat flour is traditionally used as the main ingredient for making bread and serves as a reference for comparing the amounts of other components. Detailed descriptions of such commonly known ingredients like wheat flour are therefore omitted. The present invention allows for the use of rice flour in place of wheat flour, and a mixture of both can also be used.

The liquid ingredient used in the dough is bamboo leaf extract. Bamboo leaves have been used as natural medicinal ingredients in traditional medicine for a long time and contain many pharmacologically beneficial components for the human body. Therefore, bamboo leaves are highly valued as medicinal ingredients not only in Korea but also in China and Japan.

As the benefits of bamboo leaves become widely known, public interest is increasing. Bamboo leaves have been cited in ancient texts like "Shinbong Bonchogyeong" as effective for resolving indigestion, invigorating the body, treating tumors, and reducing fever. In "Donguibogam," they are said to be effective for strokes and mental stability. They have been used as medicinal ingredients in traditional medicine for a long time, especially for treating inflammation. The bamboo leaf extract, which possesses these benefits, is made from bamboo leaves grown in uncontaminated mountains and contains various amino acids (Aspartic acid, Proline) and vitamins (Vitamin $B_1$, $B_2$, B6, B12, Vitamin C, K1), as well as a significant amount of minerals (Calcium, Potassium, Magnesium, etc.).

Additionally, the soft inner bark of the bamboo, known as "Ojookeyo" has been noted in traditional medical texts like "Bonchogangmok" to be used for treating skin dryness, owing to its high moisture content. As previously described, bamboo leaves are rich in amino acids and minerals that deeply moisturize the skin, reduce skin heat, and are known for their calming effects. Accordingly, bamboo leaves are effective in tightly sealing in skin moisture, thereby preventing moisture loss. Due to these remarkable benefits of bamboo leaf components, there has been a surge in product releases in the cosmetics industry that feature these effects.

By applying the bamboo leaf component, which offers unparalleled moisturizing effects, to the field of bread-making, it is possible to maintain the bread's moisture for an extended period, thereby providing delicious bread. Therefore, this invention has incorporated bamboo leaf extract. The invention thus utilizes this highly moisturizing bamboo leaf, extracted in liquid form, as the base liquid for the dough, achieving moisture retention in the bread after manufacturing. Bamboo leaf extract is used in an amount of 30-90 parts by weight based on 100 parts by weight of wheat flour. If the amount used is below 30 parts by weight, the dough becomes too stiff and the fermentation process does not proceed smoothly, leading to a decline in the quality of the finished bread. Also, insufficient usage of the moisturizing bamboo leaf extract does not achieve the intended moisturizing effect of this invention. If the amount used exceeds 90 parts by weight, the dough becomes too wet, causing significant inconvenience in subsequent processes, particularly in the shaping process at step S4.

In the case of making hard-type bread like baguettes, milk, eggs, and butter are not used. However, for making soft-type bread like sandwich bread, one or more ingredients among milk, eggs, and butter are used.

Therefore, when making hard-type bread, since moist ingredients like milk, eggs, and butter are not used, it is necessary to proceed with the dough using only bamboo leaf extract, using 40-80 parts by weight. For soft-type bread, taking into account the use of milk, eggs, and butter, it is advisable to use 30-90 parts by weight of bamboo leaf extract.

Correspondingly, when making soft-type bread, 5-30 parts by weight of milk, eggs, and butter are used to adjust the flavor and moisture content of the bread.

Meanwhile, the manufacturing method for the bamboo leaf extract used in Step S1 involves placing water and bamboo leaf powder in a container at a weight ratio of 1:0.01-0.2 and heating until the total initial weight is reduced by 30-80%, to obtain it in liquid form.

Here, the usage amount of bamboo leaf powder relative to 1 part by weight of water ranges from 0.01 to 0.2 parts by weight. If less than 0.01 parts by weight is used, the amount is insufficient to expect any moisturizing efficacy in the bread. If more than 0.2 parts by weight is used, although the amount is excessive, the moisturizing and wheat flour odor-removing effects may be significant, but there is a risk that the strong scent of bamboo in the finished bread could adversely affect its quality.

Bamboo leaves 1 are ideally harvested from young bamboo between April and October, cleaned thoroughly, and finely shredded as in Step 1, then dried to a moisture content of 10-15%. The moisture content is extremely important for carrying out the present invention. If the moisture content is dried to below 10%, the intrinsic moisture of the bamboo leaves evaporates substantially, making it difficult to achieve the intended effects of the invention. If it is dried to above 15%, there is a risk of spoilage during storage due to the high moisture content. Of course, using freshly harvested bamboo leaves without drying would yield a larger amount of extract, which is desirable; however, storing them until the next harvesting season poses challenges, making it necessary to use dried leaves.

The nutritional components of bamboo leaves are per 100 g as follows: niacin 0.40 mg, sodium 76.00 mg, protein 2.80 g, carbohydrates 10.50 g, retinol 0.00 μg, beta-carotene 61.00 μg, Vitamin A 10.00 μgRE, Vitamin B1 0.11 mg, Vitamin B2 0.54 mg, Vitamin B6 0.21 mg, Vitamin C 78.00 mg, Vitamin E 4.00 mg, zinc 0.27 mg, folic acid 21.00 μg, phosphorus 110.00 mg, fat iron 3.60 mg, potassium 860.00 mg, calcium 101.00 mg, cholesterol 0.00 mg, ash 2.10 g. As can be observed from these components, bamboo leaves contain a large amount of amino acids that make up vitamins and minerals, thus they can maintain the moisture in bread.

As another embodiment of the manufacturing method of bamboo leaf extract used in Step S1, water, bamboo leaf powder, and aloe powder are combined in a container in a weight ratio of 1:0.01-0.2:0.005-0.1 and heated until they reach 30-80% of their initial combined weight, thereby obtaining the extract in liquid form.

In this embodiment, aloe powder is further used. If the amount used is less than 0.005, it would be insufficient to enhance the moisturizing efficacy of the aloe, i.e., to further increase the bread's moisture retention. On the other hand, if more than ~0.1 is used, it can be expected to cooperate with the bamboo leaf components to achieve high moisturizing effects, but the scent of the aloe can mix with the scent of the bamboo leaf, changing the original aroma of the bread and causing a decline in quality. Moreover, if the aloe powder is used excessively beyond 0.1, there may be issues related to its toxicity, which could be harmful to the human body.

Aloe is used after removing the inedible parts of the leaf, drying it, and then powdering it; commercially available products were used in this invention. According to the results so far, aloe has antibacterial effects against bacteria and molds, contains aloetin that neutralizes toxins, aloeursin effective for ulcers, and aloemitin with anticancer effects. It also contains various other components like steroids, amino acids, saponins, antibiotics, wound-healing hormones, and minerals. Aloe is effective for fatigue recovery due to overwork and hangover relief due to excessive drinking. When the leaf of aloe is cut, a particularly bitter yellow substance flows out, known to be especially effective for constipation. Aloe leaf juice is also used for gastrointestinal diseases, injuries or burns, and it neutralizes both dry and oily skin while providing moisturizing effects, making it widely used as a cosmetic ingredient.

Given that aloe has excellent skin moisturizing effects and is widely used as a cosmetic ingredient, it has been applied to this invention to provide moisturizing effects to the bread.

Yet another embodiment of the manufacturing method for the bamboo leaf extract used in the aforementioned step S1 involves immersing 10-60 parts by weight of raw bamboo leaves in 100 parts by weight of water, or immersing 10-60 parts by weight of raw bamboo leaves and 1-20 parts by weight of raw aloe in 100 parts by weight of water. The mixture is heated until the combined initial weight is reduced to 50-80%, thereby obtaining a highly concentrated liquid. During the dough preparation, the obtained liquid can be diluted with water for use.

In this embodiment, the usage amounts of raw bamboo leaves and raw aloe are significantly higher than in previous embodiments, resulting in a highly concentrated bamboo leaf extract. If the same amount of this concentrated extract is used as in previous embodiments, the flavor and quality of the bread become undesirable due to the excessive concentration.

Therefore, during dough preparation, diluting the highly concentrated extract obtained with water to match the concentration level of the bamboo leaf extract in previous embodiments allows for the achievement of the objectives of the present invention. Such a practice of creating a highly concentrated bamboo leaf extract is recommended as it facilitates easier storage and distribution, thus offering convenience in use.

In the aforementioned embodiment, the concentrated extract obtained by boiling raw bamboo leaves between 10 to 60 parts by weight and raw aloe between 1 to 20 parts by weight, until achieving 50-80% of the initial weight, has a rich color and pleasant aroma.

The sugar and salt used in the dough are based on 100 parts by weight of wheat flour and are used for seasoning in the ranges of 1 to 20 parts by weight and 0.5 to 3 parts by weight, respectively. Going beyond these ranges results in bread with inferior flavor. Yeast is used as a fermenting agent for the dough and is used in the range of 0.5 to 3 parts by weight.

Meanwhile, this invention allows for the addition of fermented bamboo leaf starter in the dough during the step S1. This fermented bamboo leaf starter is used in the range of 5 to parts by weight relative to 100 parts by weight of wheat flour. Therefore, during dough preparation, a mixture of 100 parts by weight of wheat flour, 30 to 90 parts by weight of bamboo leaf extract, 5 to 30 parts by weight of fermented bamboo leaf starter, 1 to 20 parts by weight of sugar, 0.5 to 3 parts by weight of yeast, and 0.5 to 3 parts by weight of salt is prepared.

In this embodiment, using less than 5 parts by weight of fermented bamboo leaf starter renders the use of the starter almost meaningless due to insufficient quantity, and using more than 30 parts by weight risks excessively fermenting the dough in a short time, leading to spoilage.

Here, the method for producing the aforementioned fermented bamboo leaf starter includes 100 parts by weight of water as a base, and 80 to 120 parts by weight of wheat flour, along with 5 to 15 parts by weight of fermented bamboo leaf liquid starter, are placed in a microbial incubator and fermented for 20 to 30 hours at temperatures below 30° C.

The fermented bamboo leaf liquid starter is used in the range of 5 to 15 parts by weight. Using less than 5 parts by weight results in insufficient liquid for adequate fermentation of the starter, while using more than 15 parts by weight risks spoilage during the fermentation process due to excessive liquid.

Figure 2:
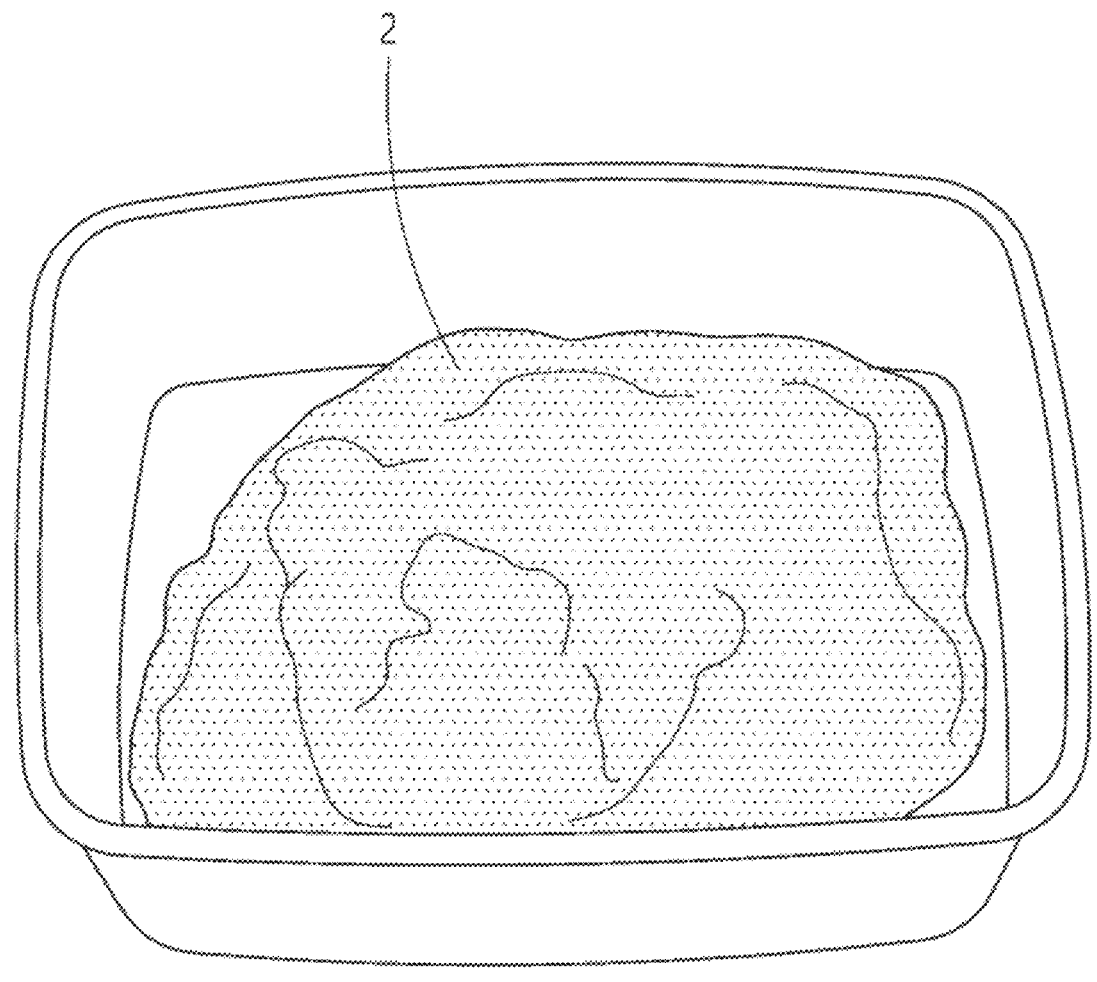
FIG. 2 is a photograph of the fermented bamboo leaf starter produced by this invention.
Figure 3:
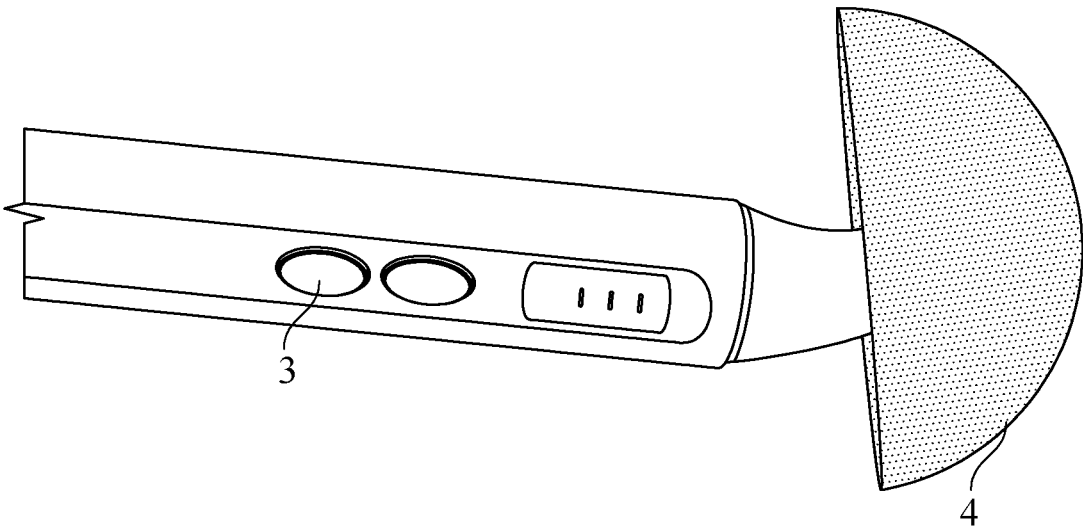
FIG. 3 is a photograph of the bread produced by this invention, where its moisture content is measured with a moisture meter.
Figure 4:
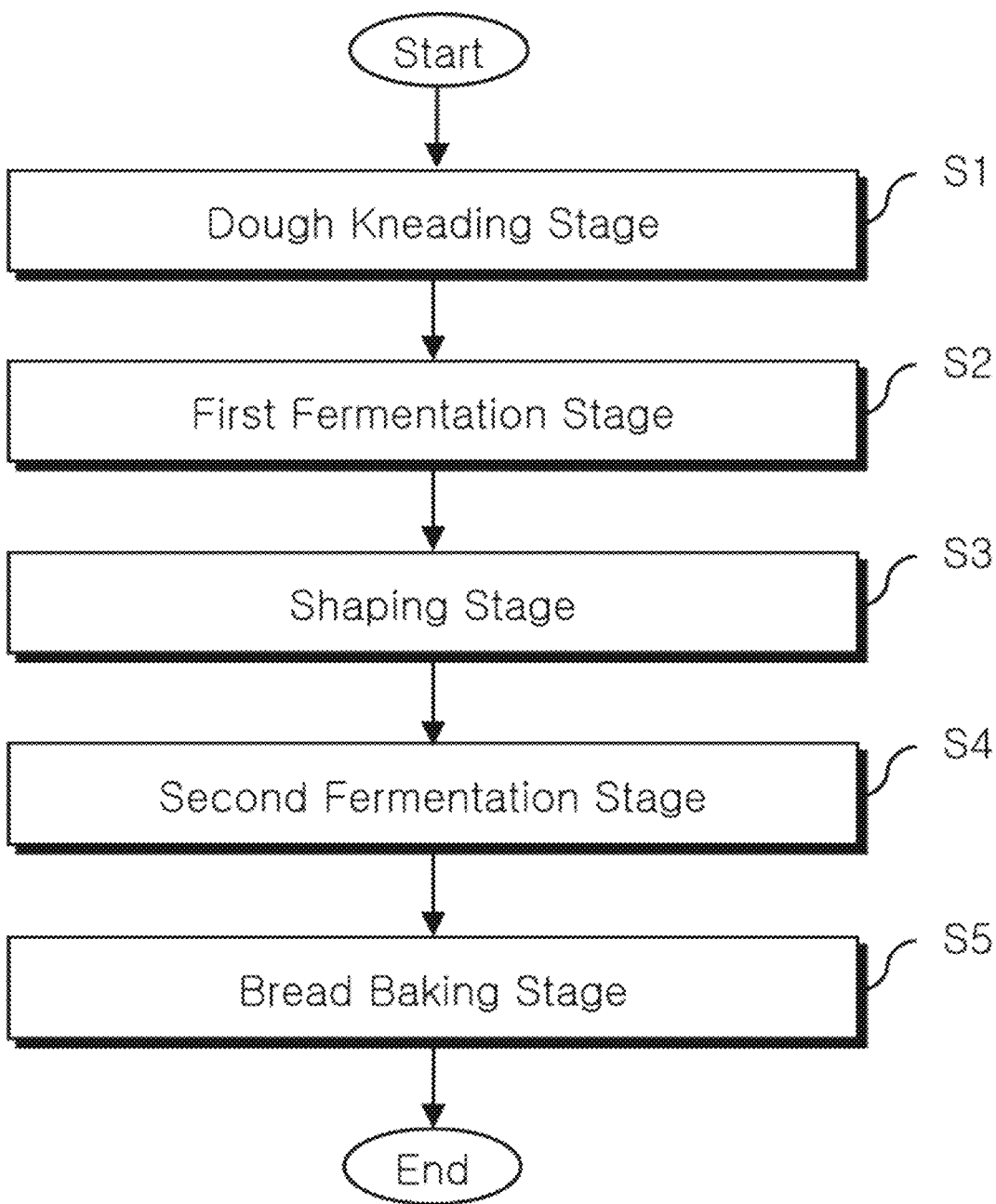
FIG. 4 is a flowchart of one embodiment of this invention.
Figure 5:
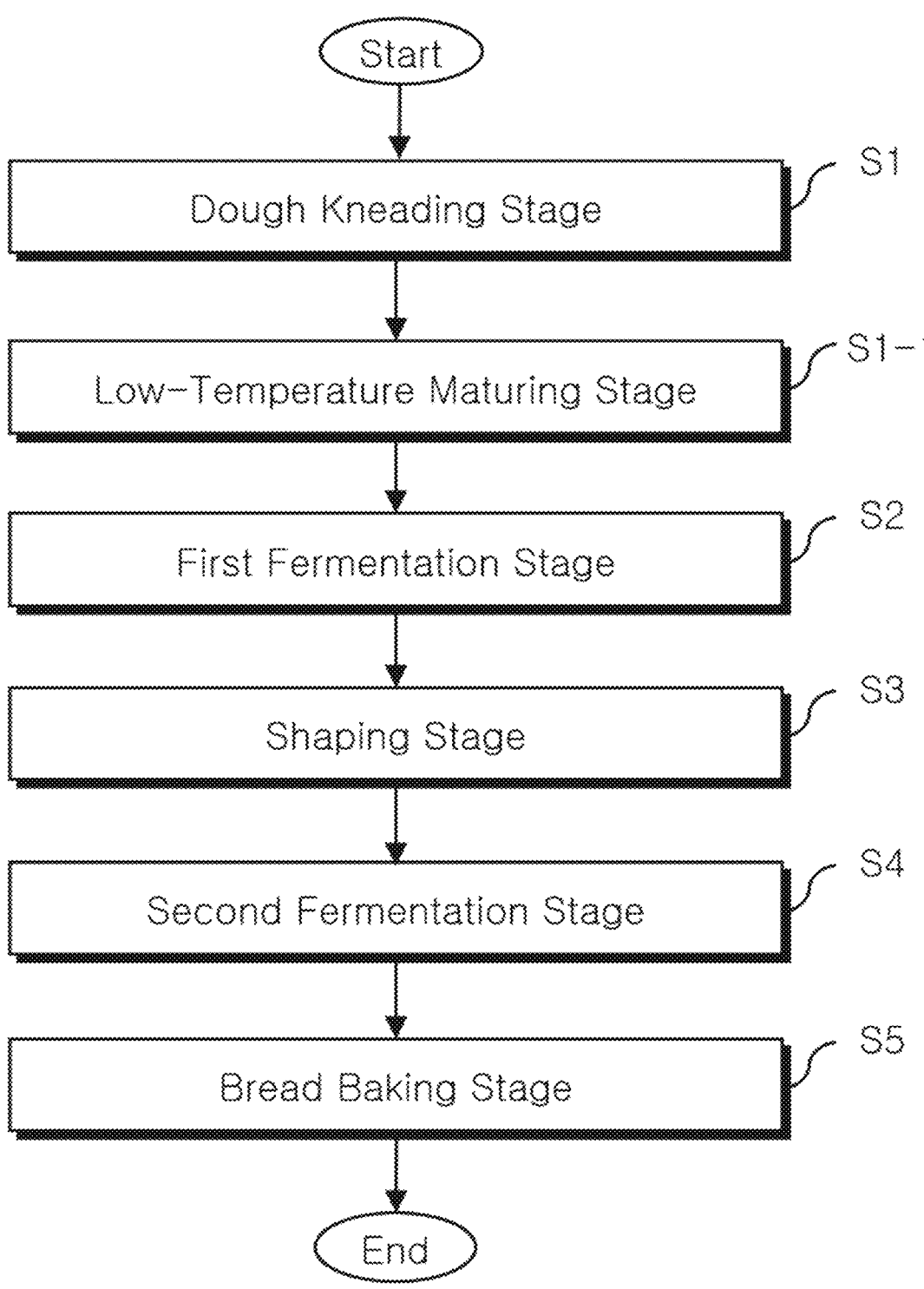
FIG. 5 is a flowchart of another embodiment of this invention.

When water, wheat flour, and fermented bamboo leaf liquid starter are mixed, a dough state is formed. Placing this dough in a microbial incubator and maturing it under conditions of 20 to 30 hours at temperatures below 30° C. leads to fermentation by the yeast in the fermented bamboo leaf liquid starter, which consumes the wheat flour, resulting in the formation of fermented bamboo leaf starter. The thus fermented bamboo leaf starter becomes very sticky, creating a highly glutinous dough similar to that shown in FIG. 2. Here, the fermented bamboo leaf liquid starter used in the manufacture of the fermented bamboo leaf starter contains 100 parts by weight of water as a base. Based on this, to 20 parts by weight of raw bamboo leaves and 1 to 5 parts by weight of raw aloe are placed in a container, and these are boiled until the initial weight is reduced by 30 to 80%. After this, the temperature is reduced to below 30° C., and the liquid obtained is mixed with rice bran enzyme and brown rice yeast in a weight ratio of 1:0.05 to 0.3:0.03 to 0.1, and placed in a microbial incubator to ferment for 2 to 4 days. Afterward, the solids are filtered out, and the liquid is collected to complete the fermented bamboo leaf liquid starter.

At this time, the rice bran enzyme is an enzyme extracted from rice bran and is in powder form; it is manufactured by Sunlight Agriculture and sold by Herb in Korea Inc. The brown rice yeast is a fermented product made by fermenting brown rice with lactic acid bacteria, among others, and a commercially available standard product was used.

Upon completion of the dough at Step S1, the dough is subsequently placed in a fermentation chamber with a temperature of 28-32° C. and undergoes first fermentation for 40 minutes to 1 hour (Step S2). During the first fermentation of the dough, the yeast causes the dough to rise, resulting in a sticky and semi-solid state. If the temperature of the fermentation chamber is below 28° C., the fermentation will be delayed, requiring more than 1 hour for the process, and if it exceeds 32° C., fermentation is accelerated, taking relatively less time, under minutes.

After completing Step S1, an additional step S1-1 can be conducted prior to Step S2, which involves first fermenting the dough. In this additional step, the dough is placed in a maturation chamber at a temperature of 3-7° C. and is subjected to low-temperature maturing for 12-24 hours. Performing this S1-1 step allows the various components constituting the dough to slowly permeate the dough in a low-temperature maturing state, resulting in a stable state and simultaneously initiating a very slow fermentation, thereby accelerating the subsequent first fermentation. The execution of Step S1-1 stabilizes the dough into a semi-solid state. If the temperature is below 3° C. in this S1-1 step, the dough reaches a refrigerated state and stabilization is not effectively achieved, requiring more than 24 hours for low-temperature maturing. Conversely, if the temperature exceeds 7° C., the time required for the dough to stabilize is shortened and fermentation starts before stabilization, eliminating the need for the low-temperature maturing step S1-1.

fermentation is placed in a fermentation chamber with a temperature of 28-32° C. and undergoes second fermentation for 40 minutes to 1 hour in Step S4. During Step S3, the product of the first fermentation gets divided and compressed, causing it to become compact. Therefore, when the shaped product of the first fermentation undergoes second fermentation, the dough fully ferments and rises, achieving a completely shaped form while also becoming more sticky, thereby finally taking on the form of bread. The fermentation conditions for this second fermentation step, specifically 28-32° C. and 40 minutes to 1 hour, are ideal for executing the present invention. If these thresholds are exceeded, the bread could either lack flavor due to insufficient fermentation or risk spoilage due to excessive fermentation.

Upon completion of the second fermentation step S4, the product of the second fermentation is placed in an oven and baked at a temperature of 150-220° C. for 10-30 minutes in Step S5 to finalize the bread.

Example 1 to Example 5

Bread containing bamboo leaf extract was manufactured under the conditions listed in [Table 1]. Wheat flour was used as the standard amount for each component, consistently using 1 kg. Example 1 used bamboo leaf extract that did not include aloe, and it did not use fermented bamboo leaf starter, milk, eggs, or butter, resulting in a hard-type baguette. Example 2 used bamboo leaf extract containing aloe and fermented bamboo leaf starter, but did not use milk, eggs, or butter, also resulting in a hard-type baguette. Examples 3 to 5 used bamboo leaf extract containing aloe, fermented bamboo leaf starter, milk, eggs, and butter to produce a soft-type morning bread.

TABLE 1

| Category | Item | Example 1 | Example 2 | Example 3 | Example 4 | Example 5 |
|---|---|---|---|---|---|---|
| Dough | Wheat Flour (kg) | 1 | 1 | 1 | 1 | 1 |
| Ingredients | Bamboo Leaf Extract (No Aloe) (kg) | 0.7 | — | — | — | — |
| | Bamboo Leaf Extract (With Aloe) (kg) | — | 0.6 | 0.5 | 0.9 | 0.8 |
| | Fermented Bamboo Leaf Starter (kg) | — | 0.05 | 0.1 | 0.3 | 0.1 |
| | Milk (kg) | — | — | 0.2 | 0.2 | 0.3 |
| | Egg (kg) | — | — | 0.2 | 0.2 | 0.3 |
| | Butter (kg) | — | — | 0.2 | 0.2 | 0.3 |
| | Sugar (kg) | 0.05 | 0.05 | 0.1 | 0.1 | 0.2 |
| | Yeast (kg) | 0.002 | 0.002 | 0.002 | 0.002 | 0.002 |
| | Salt (kg) | 0.002 | 0.002 | 0.002 | 0.002 | 0.002 |
| Low-Temperature | Temperature (° C.) | 3 | 4 | 5 | 5 | 7 |
| Maturing | Time (h) | 12 | 15 | 18 | 21 | 24 |
| First | Temperature (° C.) | 28 | 29 | 30 | 31 | 32 |
| Fermentation | Time (h) | 40 | 45 | 50 | 55 | 60 |
| Second | Temperature (° C.) | 32 | 31 | 30 | 29 | 28 |
| Fermentation | Time (h) | 40 | 45 | 50 | 55 | 60 |
| Sensory | Moisture Content | 4.7 | 4.7 | 4.7 | 4.8 | 4.7 |
| Evaluation | Taste | 4.5 | 4.6 | 4.7 | 4.8 | 4.7 |
| | Aroma | 4.7 | 4.7 | 4.8 | 4.9 | 4.8 |
| | Preference | 4.6 | 4.7 | 4.7 | 4.9 | 4.8 |

Sensory Evaluation: 1 point: Very Poor, 2 points: Poor, 3 points: Average, 4 points: Good, 5 points: Very Good Once the first fermentation is complete at Step S2, the product of the first fermentation is then divided into uniform sizes and shaped into desired forms in Step S3. Various shapes can be achieved during this shaping step S3, offering diversity in the final bread form. Following the completion of shaping in Step S3, the shaped product of the first

Comparative Example 1 to Comparative Example 4

Bread was manufactured according to the conditions outlined in [Table 2], that is, without using bamboo leaf extract or fermented starter, and without low-temperature maturing. Comparative Examples 1 and 2 produced a hard-type baguette without using milk, eggs, or butter. Comparative Examples 3 and 4 used them to produce a soft-type morning bread.

12 was taken out, and the end of the moisture meter 3 was inserted into the interior of the bread 4 to measure the moisture retention rate.

TABLE 2

| Category | Item | Comparative Example 1 | Comparative Example 2 | Comparative Example 3 | Comparative Example 4 |
|---|---|---|---|---|---|
| Dough | Wheat Flour (kg) | 1 | 1 | 1 | 1 |
| Ingredients | Water (kg) | 0.7 | 0.8 | 0.8 | 0.8 |
| | Milk (kg) | — | — | 0.2 | 0.2 |
| | Egg (kg) | — | — | 0.2 | 0.2 |
| | Butter (kg) | — | — | 0.2 | 0.2 |
| | Sugar (kg) | 0.05 | 0.2 | 0.1 | 0.1 |
| | Yeast (kg) | 0.001 | 0.003 | 0.001 | 0.003 |
| | Salt (kg) | 0.001 | 0.003 | 0.001 | 0.003 |
| First | Temperature (° C.) | 28 | 32 | 28 | 32 |
| Fermentation | Time (h) | 40 | 60 | 40 | 60 |
| Second | Temperature (° C.) | 28 | 32 | 28 | 32 |
| Fermentation | Time (h) | 40 | 60 | 40 | 60 |
| Sensory | Moisture Content | 3.1 | 3.1 | 3.1 | 3.1 |
| Evaluation | Taste | 3.1 | 3.3 | 3.0 | 3.5 |
| | Aroma | 3.0 | 3.2 | 3.2 | 3.5 |
| | Preference | 3.0 | 3.3 | 3.2 | 3.5 |

Sensory Evaluation: 1 point: Very Poor, 2 points: Poor, 3 points: Average, 4 points: Good, 5 points: Very Good The sensory evaluation was carried out by providing free samples of bread manufactured under the conditions of the above-mentioned examples and comparative examples to 100 customers who visited the applicant's business location in Hanam, Gyeonggi Province of Republic of Korea. The evaluation was based on a 5-point scale, considering moisture content, taste, aroma, and preference, using an average score of 3 as the baseline. One baguette manufactured either on the day or the previous day, and another after 5 days were provided for the first evaluation. The same was done for morning bread for the second evaluation. The results are shown in Tables 1 and 2.

From the evaluation results of Tables 1 and 2, it is evident that the bread manufactured by this invention received significantly excellent evaluations in all aspects, including moisture content, taste, aroma, and preference. Most evaluators did not notice any difference in each aspect of the sensory evaluation between the freshly made bread and the bread after 5 days, especially in moisture content. This is believed to be because the bamboo leaf extract wraps around the surface of the bread, preventing moisture evaporation and suppressing the odor of the wheat flour. Example 4 received the highest ratings in all aspects during the sensory evaluation, which is assumed to be due to the highest content of bamboo leaf extract and fermented bamboo leaf starter.

On the other hand, it is inferred that the comparative examples, which did not use bamboo leaf extract and only used water and wheat flour for the dough, did not yield good results in the sensory evaluation.

Experimental Example 1

The results of the moisture retention rate measured for the bread manufactured under the conditions of Example 4 and Comparative Example 4 are shown in [Table 3] below. On Jan. 22, 2021, seven pieces of morning bread manufactured under the conditions of Example 4 and Comparative Example 4 were each placed in the plastic bags used for packaging bread sold in bakeries and stored at room temperature. During each moisture retention rate test, one piece

TABLE 3

| Date | Time | Example 4 Bread Moisture Rate (%) | Comparative Example 4 Bread Moisture Rate (%) |
|---|---|---|---|
| 2021 Jan. 22 | 11:20 PM | 86.3 | 80.2 |
| 2021 Jan. 23 | 4:00 AM | 85 | 81.4 |
| 2021 Jan. 24 | 5:00 AM | 83.6 | 75.9 |
| 2021 Jan. 24 | 10:30 PM | 80.5 | 67.9 |
| 2021 Jan. 26 | 10:30 AM | 78.5 | 62.5 |
| 2021 Jan. 27 | 11:30 AM | 72.5 | 59.3 |
| 2021 Jan. 28 | 11:00 AM | 68.3 | 54.9 |

On the day of manufacture, specifically on Jan. 22, 2021, the test results showed that the moisture retention rate of the bread from Example 4 was 86.3%, while that of the bread from Comparative Example 4 was 80.2%. Six days after the manufacturing date, on Jan. 28, 2021, the moisture retention rate for the bread from Example 4 was 68.3%, whereas that of the bread from Comparative Example 4 was 54.9%.

Based on these experimental results, the bread from Example 4, manufactured according to the present invention, had a moisture content 6.1% higher than that of the bread from Comparative Example 4 on the day of manufacture. Over time, this difference in moisture content progressively expanded, reaching a 13.4% difference by the final day of the test. This suggests that the bamboo leaf extract inhibits the evaporation of moisture from the bread, thereby increasing its moisture retention rate.

Meanwhile, although the above description explains the manufacture of the fermented liquid starter by adding raw bamboo leaves to water, it does not exclude the use of substitutes for raw bamboo leaves. That is, bamboo leaf powder or bamboo teabags can be used in place of raw bamboo leaves, and these should be interpreted as equivalents to raw bamboo leaves.

The present invention differs from the conventional bread manufacturing method, which uses water for the dough. Specifically, it utilizes bamboo leaf extract as the liquid base for the dough. Because the entire liquid content of the dough is bamboo leaf extract, it not only achieves the dual purpose of reducing the off-odors from wheat flour and enhancing the moisture retention in bread but also uses fermented bamboo leaf starter to accelerate the fermentation of the dough, thereby providing a more suitable bread. This serves as evidence of the innovativeness of the present invention.

INDUSTRIAL APPLICABILITY

This invention can be utilized in bread manufacturing to improve moisture retention effects and reduce the undesirable odors of wheat flour.

What is claimed is:

1. A method for producing bamboo leaf extract-containing bread comprising the steps of:

(S1) mixing wheat flour with, based on 100 parts by weight of the wheat flour, 30 to 90 parts by weight of a bamboo leaf extract, 5 to 30 parts by weight of a fermented bamboo leaf starter, 1 to 20 parts by weight of sugar, 0.5 to 3 parts by weight of yeast, and 0.5 to 3 parts by weight of salt, and kneading the mixture to obtain a dough;

(S2) placing the dough obtained in step (S1) in a fermentation chamber at 28 to 32° C., and subjecting the same to a first fermentation for 40 minutes to 1 hour;

(S3) dividing a product of the first fermentation obtained in step (S2) into predetermined sizes, and shaping the same into a desired form;

(S4) placing the product of the first fermentation shaped in step (S3) in a fermentation chamber at 28 to 32° C., and subjecting the same to a second fermentation for 40 minutes to 1 hour; and (S5) placing a product of the second fermentation obtained in step (S4) in an oven, and baking the same at a temperature of 150 to 220° C. for 10 to 30 minutes, wherein the fermented bamboo leaf starter in step (S1) is prepared by placing in a microbial incubator water and, based on 100 parts of the water, 80 to 120 parts by weight of wheat flour, and 5 to 15 parts by weight of a fermented bamboo leaf liquid, followed by fermentation at 30° C. or lower for 20 to 30 hours, wherein the fermented bamboo leaf liquid is prepared by placing in a container water and, based on 100 parts by weight of the water, 5 to 20 parts by weight of raw bamboo leaves, and 1 to 5 parts by weight of raw aloe, boiling them until they reach 30 to 80% of the total initial weight thereof to obtain a liquid, mixing the obtained liquid, rice bran enzyme, and brown rice yeast at a weight ratio of 1:0.05 to 0.3:0.03 to 0.1, and placing the resulting mixture in a microbial incubator, followed by fermentation at 30° C. or lower for 2 to 4 days.

2. The method according to claim 1, wherein any one or two or more selected from among milk, egg, and butter are further mixed in step (S1).

3. The method according to claim 2, wherein each of the milk, the egg, and the butter is used in an amount of 5 to 30 parts by weight based on 100 parts by weight of the wheat flour.

4. The method according to claim 1, wherein the bamboo leaf extract in step (S1) is obtained in liquid form by placing water and bamboo leaf powder in a container at a weight ratio of 1:0.01 to 0.2, and boiling them until they reach 30 to 80% of the total initial weight thereof, or is obtained in liquid form by placing water, bamboo leaf powder, and aloe powder in a container at a weight ratio of 1:0.01 to 0.2:0.005 to 0.1, and boiling them until they reach 30 to 80% of the total initial weight thereof.

5. The method according to claim 1, wherein the bamboo leaf extract in step S1 is obtained in a highly concentrated liquid form by immersing 10 to 60 parts by weight of raw bamboo leaves in 100 parts by weight of water, or by immersing 10 to 60 parts by weight of raw bamboo leaves and 1 to 20 parts by weight of raw aloe in 100 parts by weight of water, and boiling them until they reach 50 to 80% of the total initial weight thereof, and the obtained liquid is diluted in water and used in the kneading.

6. The method according to claim 1, further comprising, after step (S1) but before step (S2), a step (S1-1) of placing the dough obtained in step (S1) in a ripening room at 3 to 7° C., and subjecting the same to low-temperature ripening for 12 to 24 hours.

* * * * *